US009227311B2

(12) United States Patent
Cheng

(10) Patent No.: US 9,227,311 B2
(45) Date of Patent: Jan. 5, 2016

(54) REMOVAL TOOL FOR SERVO HORN WITH SPLINE-SHAFT COUPLING

(75) Inventor: Bing Cheng, Taipei (TW)

(73) Assignee: Model Research International Co., Ltd., Taipei (TW)

( * ) Notice: Subject to any disclaimer, the term of this patent is extended or adjusted under 35 U.S.C. 154(b) by 930 days.

(21) Appl. No.: 13/452,481

(22) Filed: Apr. 20, 2012

(65) Prior Publication Data

US 2013/0276279 A1 Oct. 24, 2013

(51) Int. Cl.
*B23P 19/04* (2006.01)
*B25B 27/02* (2006.01)
*B25B 27/14* (2006.01)
*B25B 27/06* (2006.01)

(52) U.S. Cl.
CPC ............... *B25B 27/023* (2013.01); *B25B 27/14* (2013.01); *B25B 27/062* (2013.01); *Y10T 29/53796* (2015.01); *Y10T 29/53848* (2015.01)

(58) Field of Classification Search
USPC ........................................................... 29/256
See application file for complete search history.

(56) References Cited

U.S. PATENT DOCUMENTS 1,177,843 A * 4/1916 Ackerman et al. ....... 29/243.519
1,682,956 A * 9/1928 Dawson et al. ................. 29/246
3,599,311 A 8/1971 Ellis
3,748,718 A * 7/1973 Russell ........................... 29/283
3,781,963 A * 1/1974 Felser, Jr. ........................ 29/282
4,235,004 A 11/1980 Floyd
4,263,705 A * 4/1981 Devening ........................ 29/256
6,192,566 B1 * 2/2001 Dunum ........................... 29/239
6,266,860 B1 7/2001 Kiebler
6,343,497 B2 * 2/2002 Hasegawa ....................... 72/102
2001/0001165 A1 * 5/2001 Hasegawa ..................... 29/34 R

FOREIGN PATENT DOCUMENTS

CN 101450478 A 6/2009
DE 202011001883 U1 * 10/2011

OTHER PUBLICATIONS

Communication From the Austrailian Patent Office Regarding a Counterpart Foreign Application Dated Feb. 26, 2015.
Communication From the Chinese Patent Office Regarding a Counterpart Foreign Application Dated Feb. 2, 2015.

* cited by examiner

*Primary Examiner* — Lee D Wilson
*Assistant Examiner* — Alvin Grant
(74) *Attorney, Agent, or Firm* — Rosenberg, Klein & Lee

(57) ABSTRACT

A device to remove a metal servo horn in an efficient way by utilizing the lifting force to separate servo horn from a servo output shaft when screw is rotated counter-clockwise and hits against the concave of lower surface of upper front plate of the device. Clamping force provided by two fastening members combines the device and servo horn into one integrated unit to avoid the distortion of open end of the device when lifting force is greater than rigidity of the device. When a lifting force for removing the integrated unit is applied in direction opposite to installing direction of servo horn, it overcomes the friction between the inner splines of servo horn and the outer splines of servo output shaft then separates both splines. The removal of the servo horn from the servo output shaft is achieved.

5 Claims, 14 Drawing Sheets

REMOVAL TOOL FOR SERVO HORN WITH SPLINE-SHAFT COUPLING

BACKGROUND OF THE INVENTION

1. Field of the Invention

The present invention relates to the removal of servo horns used in radio control models, and more particularly to a device for the removal of machining parts coupled by spline shafts such as servos with servo horns.

2. Description of the Prior Art

FIG. 1 shows the joining structure of a conventional servo 10 and its servo horn 11. The servo horn 11 has an extended arm with an inner spline 111 inside of the connecting boss and an opening 112 in the center of the inner spline 111. An outer spline shaft 12 is an extended integration of a shaft portion 121 with the outer spline 122 to match the inner spline 111. A screw 13 is tightened into a threaded hole 123 to secure the servo horn 11 to the outer spline shaft 12. Then servo horn 11 is engaged to the outer spline shaft 12 securely.

The output torque of the servo 10 is carried out by the engagement of the outer spline shaft 12 and the servo horn 11. The outer spline shaft 12 and the servo horn 11 are normally made of metal to obtain the maximum strength of the engagement and also improve the output torque. However, the requirement of tight-fit of spline coupling also makes it hard to separate the servo horn 11 and the outer spline shaft 12.

SUMMARY OF THE INVENTION

The primary object of the present invention is to provide a device for the removal of a metal servo horn, which has inner splines mounted on the outer splines of the servo output gear.

The present invention comprises an open end and a close end with several drilled or tapped holes on the bottom plate and drilled hole on the upper plate of the open end for screws to clamp the servo horn. The lifting force, created by the counter-clockwise rotation of the screw when the screw hits against the lower surface of the upper plate, applied on the lower plate of the front open end will separate the servo horn from the servo output shaft effectively when the clamping mechanism integrates the present invention and servo horn into one unit. This clamping force is necessary when the separating force of servo horn and servo output shaft required is much greater than the rigidity of the present invention formed by the open and close ends.

DETAILED DESCRIPTION OF THE PREFERRED EMBODIMENTS

Referring to FIGS. 2-6, a device for servo horn removal tool (SRT) in accordance with the present invention comprises a lifting member 30 and two fastening members 50 and is used to remove the servo horn 21 from the servo 20.

Figure 1:
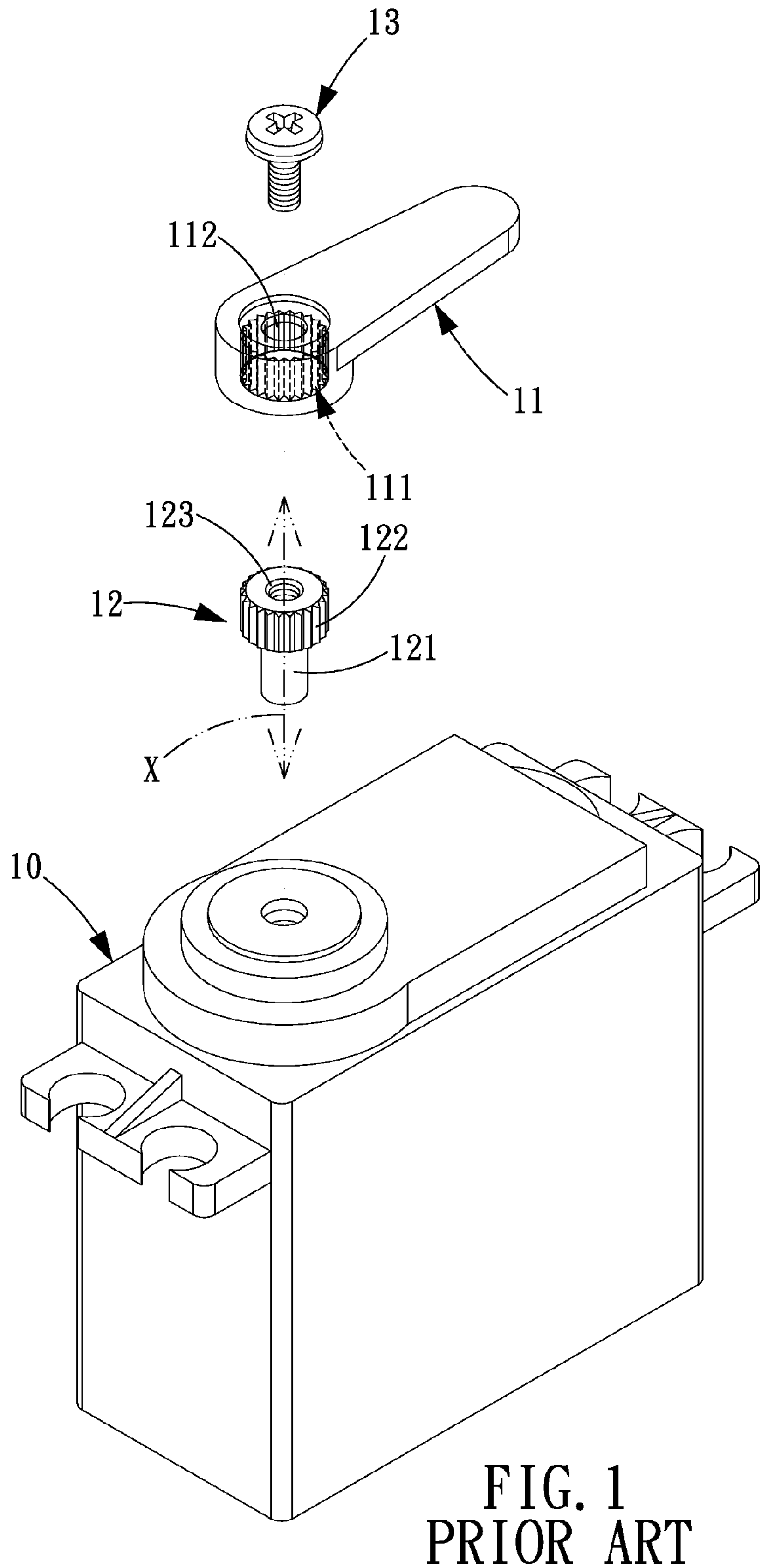
FIG. 1 PRIOR ART
FIG. 1 is an exploded view of a conventional servo.
Figure 2:
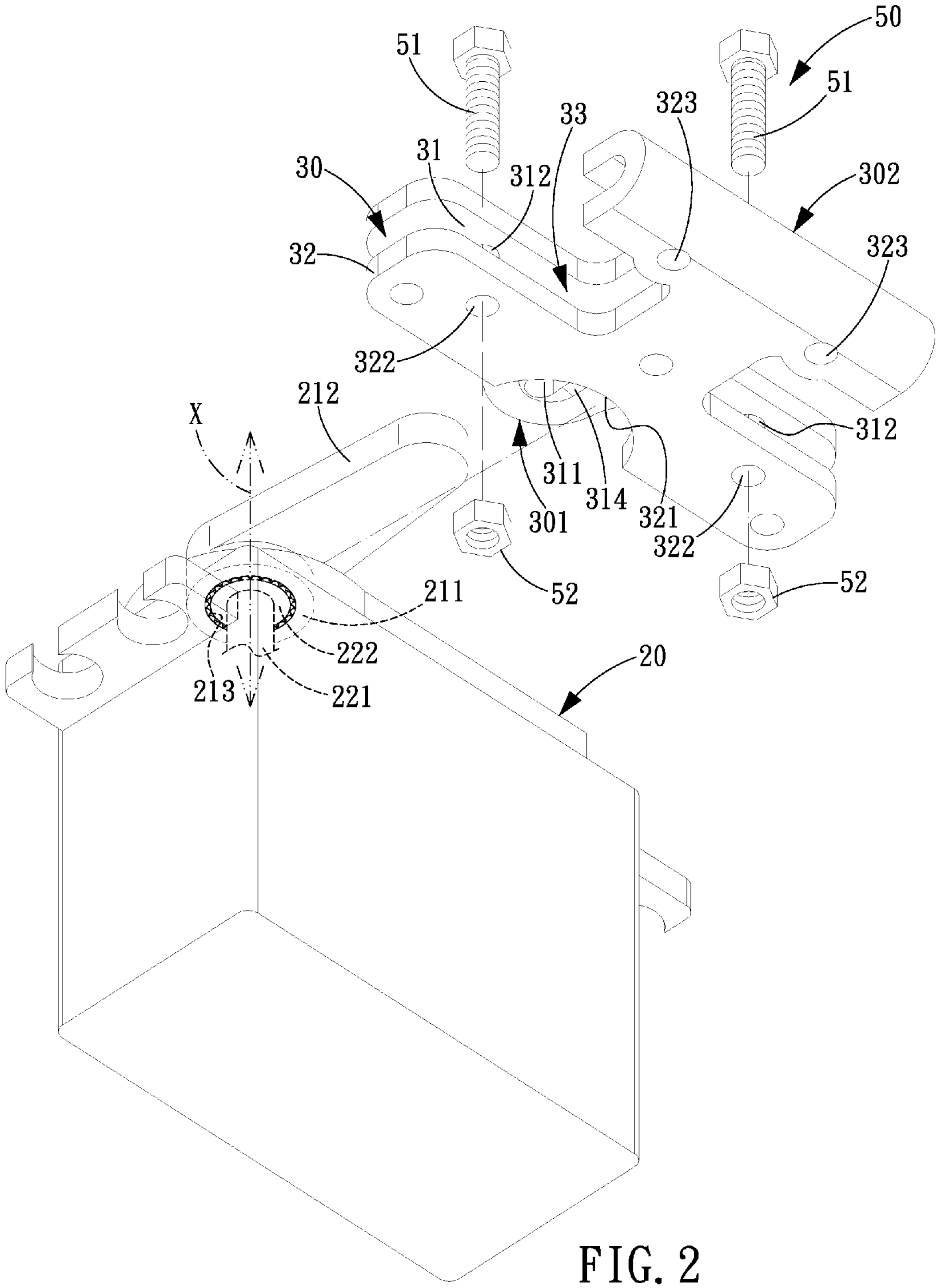
FIG. 2 is an exploded view of the present invention with a conventional servo.
Figure 6:
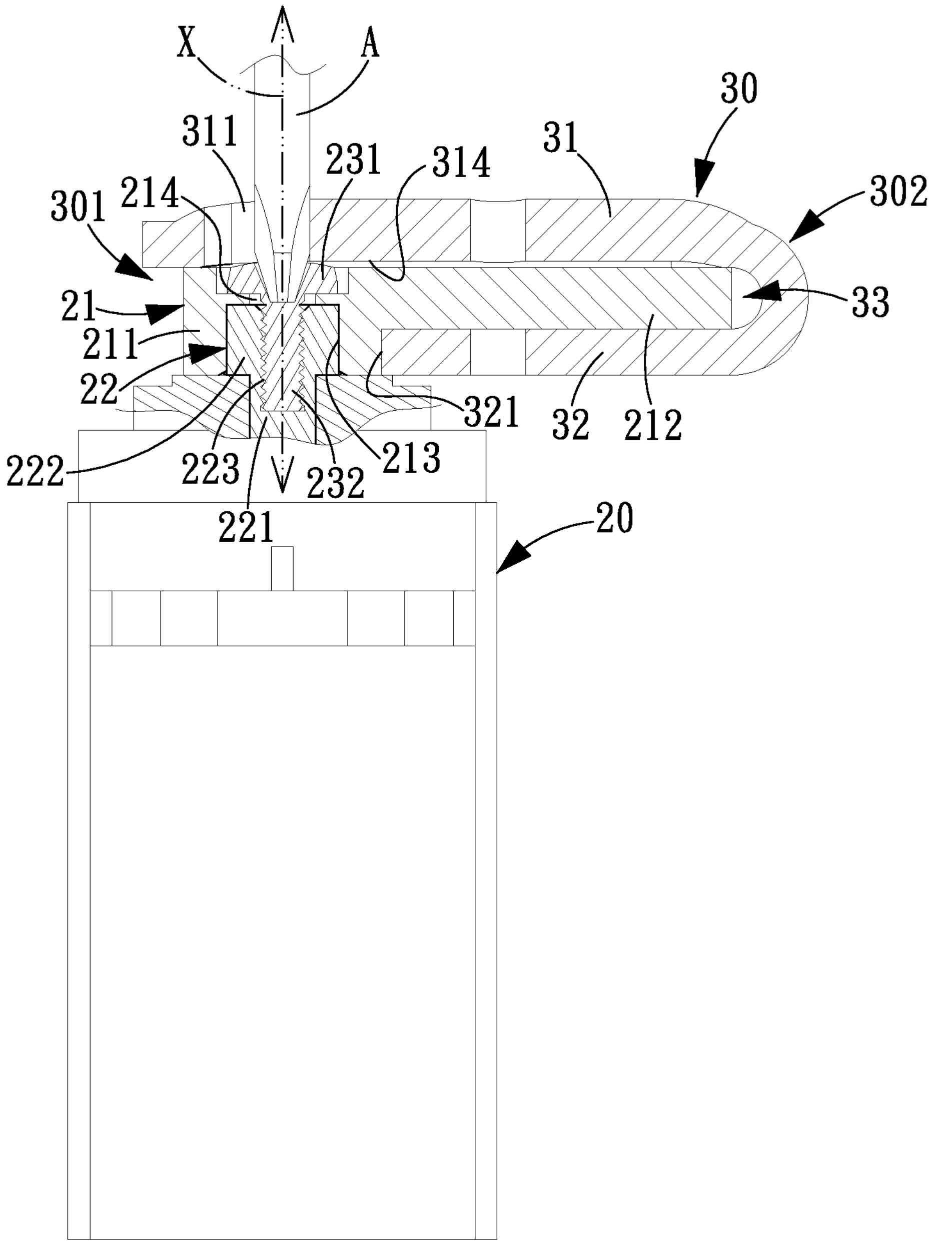
FIG. 6 is a cross sectional view taken along the line 6-6 of FIG. 4.

As shown in FIGS. 2 and 6, the servo 20 comprises an outer spline shaft 22 engages with the inner spline 111 of the servo horn 21, which is secured by a screw 23. The servo horn 21 is one end thereof with a connecting boss 211.

A perpendicular direction of the connecting boss 211 is defined as an axial direction X. The connecting boss 211 is formed with an inner spline 213 (in the form of an internal spline gear) and an opening 214 in the bottom of the inner spline 213.

Figure 4:
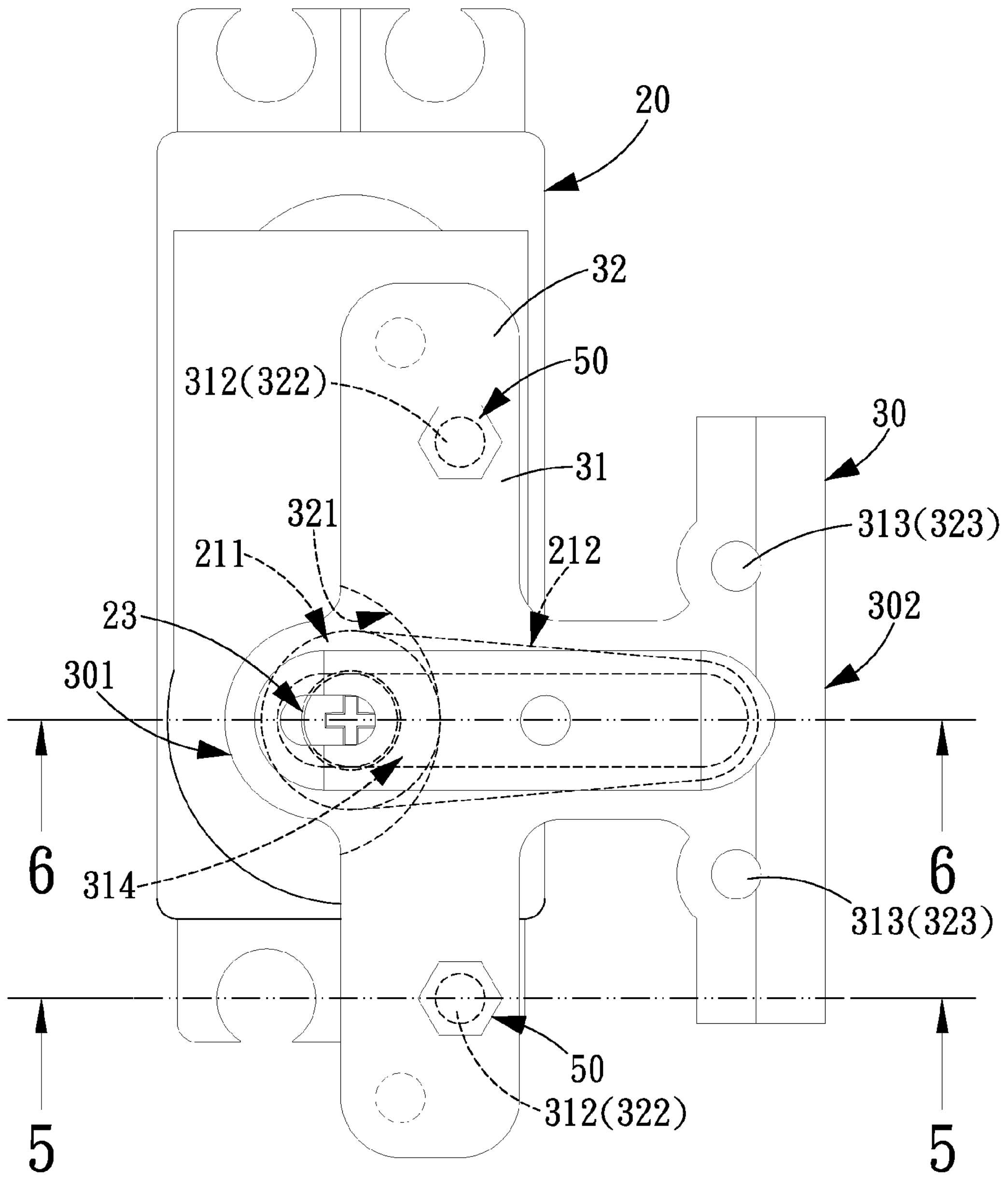
FIG. 4 is a top view of FIG. 2.

As shown in FIGS. 4 and 6, the output shaft 221 of the outer spline shaft 22 is integrated with the servo 20. The outer spline shaft 22 engages with the inner spline 213 of the servo horn 21. The output shaft 221 has a threaded hole 223 which aligns with the opening 214 of the servo horn 21. The screw 23 includes a head portion 231 and a body 232. The body 232 of the screw 23 goes through the opening 214 of the servo horn 21 and turns into the threaded hole 223 of the outer spline shaft 22.

Figure 3:
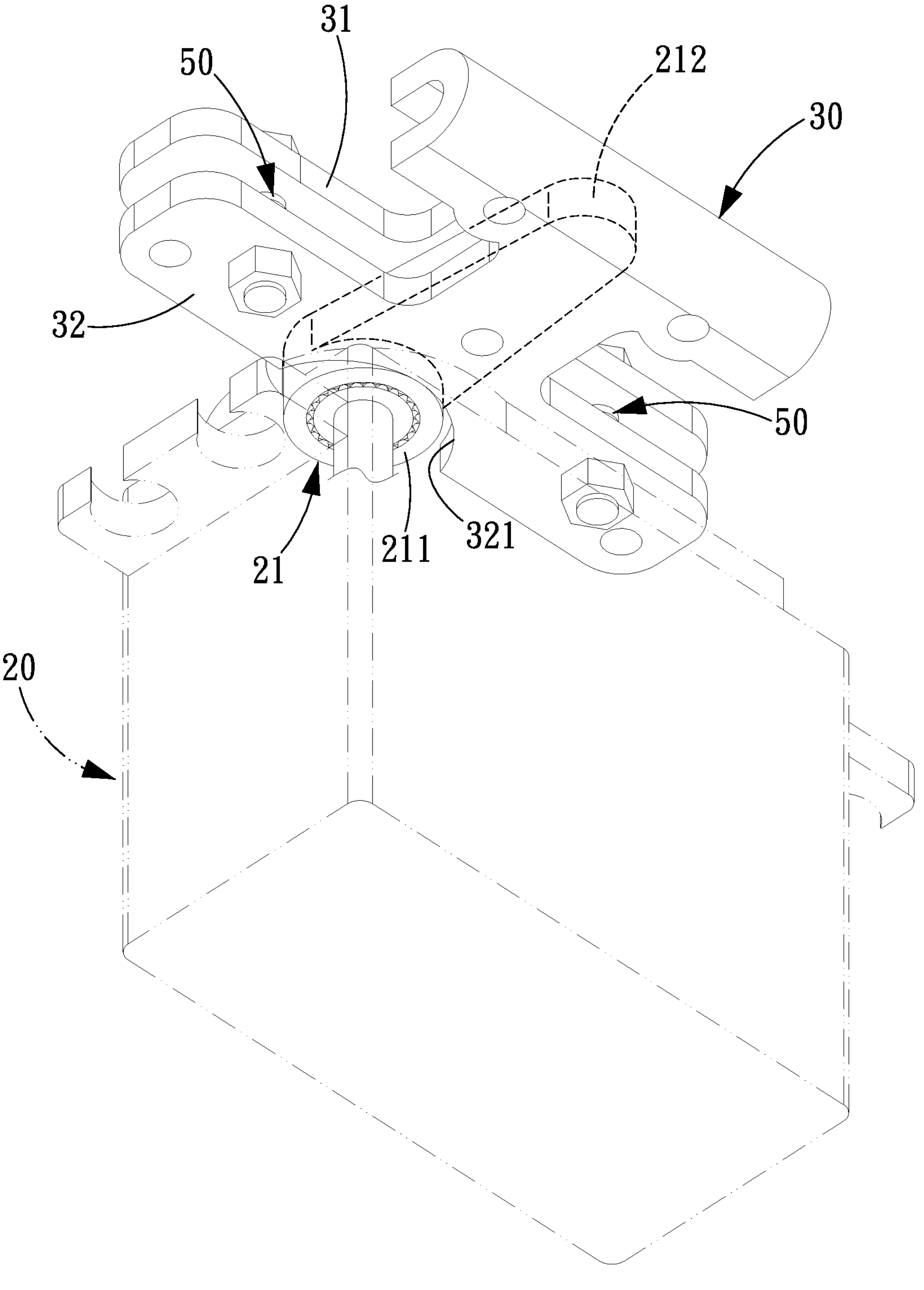
FIG. 3 is an assembly view of the present invention and a conventional servo.

The lifting member 30, as shown in FIGS. 2 and 3, includes an open end 301 and a closed end 302. The closed end 302 extends toward the open end 301 to form an active-lifting portion 31 and a passive-lifting portion 32. The active-lifting portion 31 is formed as the upper plate of the open end 301 with an elongated hole 311 and concave area 314, and the passive-lifting portion 32 is formed as the lower plate of the open end 301 with an arc 321 under the elongated hole 311. A space 33 is formed between the passive-lifting portion 32 and the active-lifting portion 31 for holding of the assembling portion 212 of the servo horn 21. When the connecting boss 211 of the servo horn 21 contacts the edge of the arc 321 of the passive-lifting portion 32, the head portion 231 of the screw 23 is coincident closely with the lower edge of the elongated hole 311 of the active-lifting portion 31. The lower edge of the elongated hole 311 of the active-lifting portion 31 provides a concave area 314 for seating the head portion 231 of the screw 23.

When two fastening members 50 are clamping the active-lifting portion 31 and the passive-lifting portion 32 in both sides of the lifting member 30, the servo horn 21 fits between the space 33 and is integrated with the active-lifting portion 31 and the passive-lifting portion 32 when it is clamped.

Figure 5:
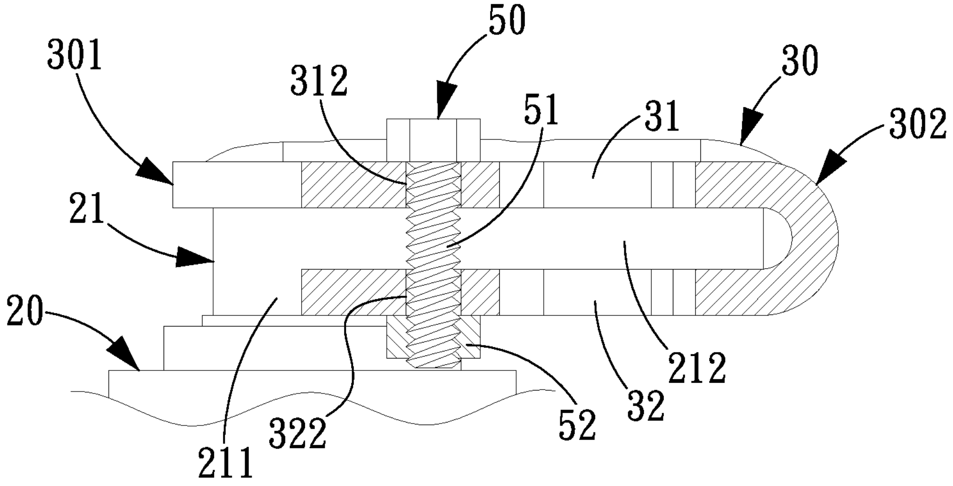
FIG. 5 is a cross sectional view taken along the line 5-5 of FIG. 4.

As shown in FIGS. 2 and 5, the fastening members 50 include a bolt 51 and a nut 52. Two positioning holes 312 in both ends of the active-lifting portion 31 are aligned with two positioning holes 322 of the passive-lifting portion 32. The bolts 51 and the nuts 52 combine the active-lifting portion 31, the passive-lifting portion 32 and the servo horn 21 into one integrated unit when they are tightened so there is no gap between these three members. The closed end 302 provides the transmitting power during lifting process, which is executed by the lower surface of the active-lifting portion 31 and upper surface around the edge of arc 321 against the upper surface and lower surfaces of the servo horn 21, respectively. The integration of the lifting member 30 and the servo horn 21 is then achieved.

As shown in FIG. 6, when the screw 23 is rotated counterclockwise by a screwdriver A, it will move upward in the axial direction X and hit against the concave area 314 of the lifting member 30 to lift the integrated lifting members 30 and the servo horn 21 away from outer spline shaft 22 then gradually separate the inner spline 213 and the gear 222.

Figure 7:
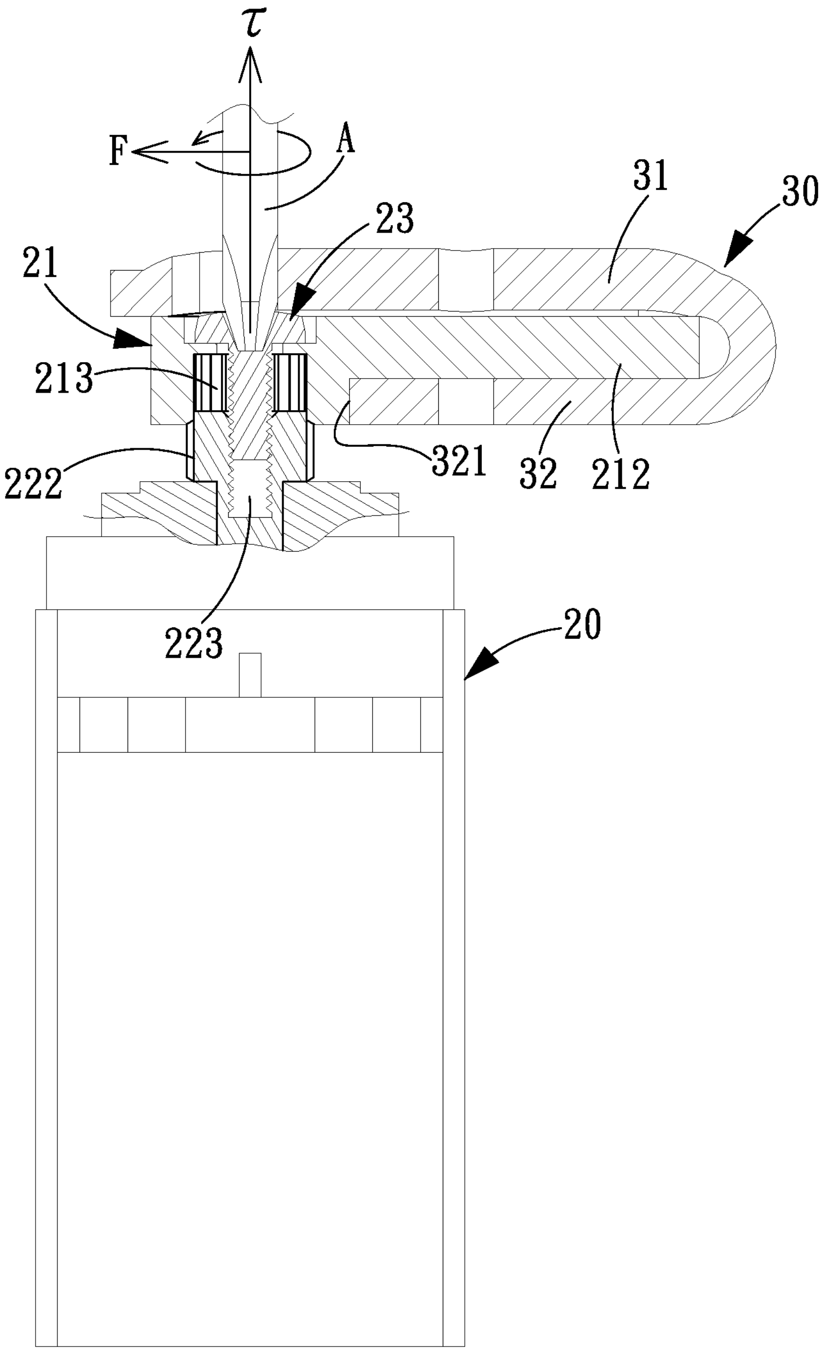
FIG. 7 is an operational view of FIG. 6.
Figure 8:
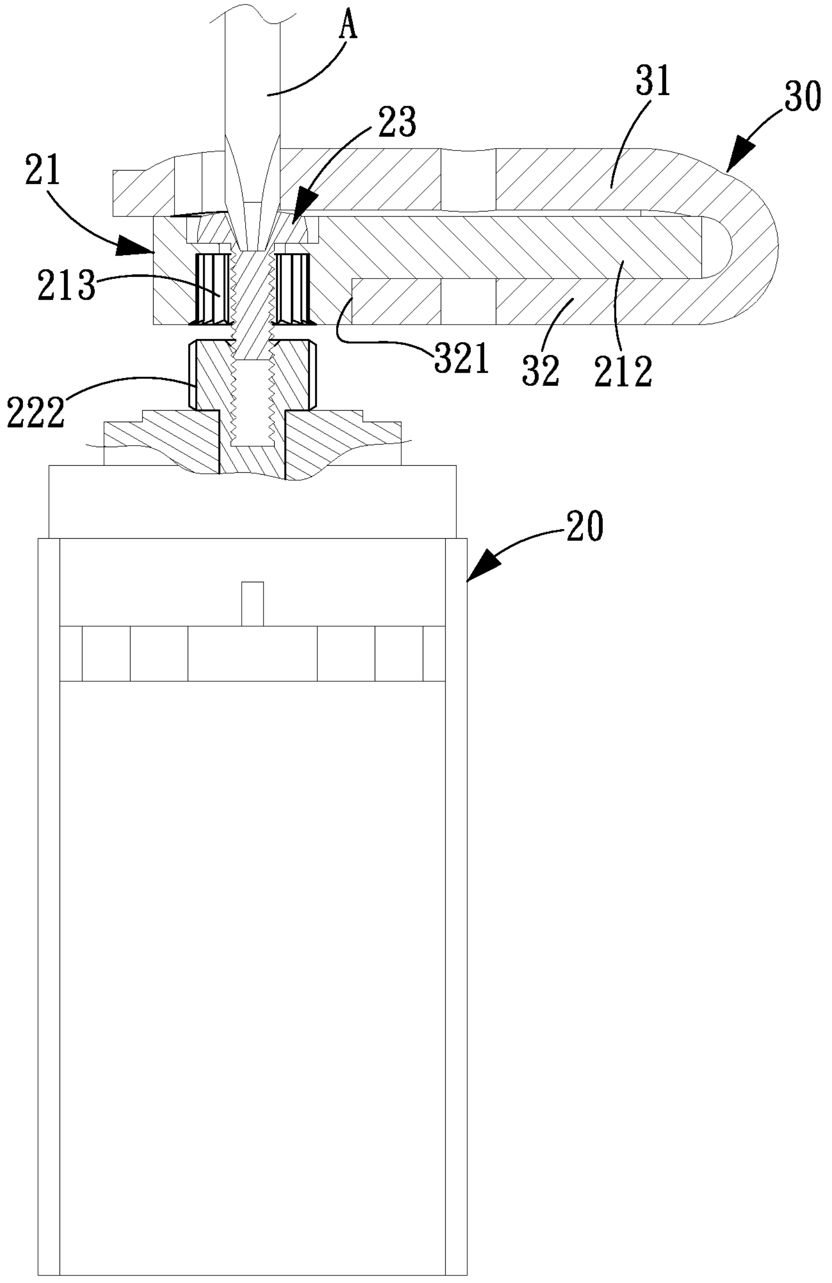
FIG. 8 is a cross sectional view showing that the lifting member in accordance with the present invention is used to remove the servo horn.
Figure 9:
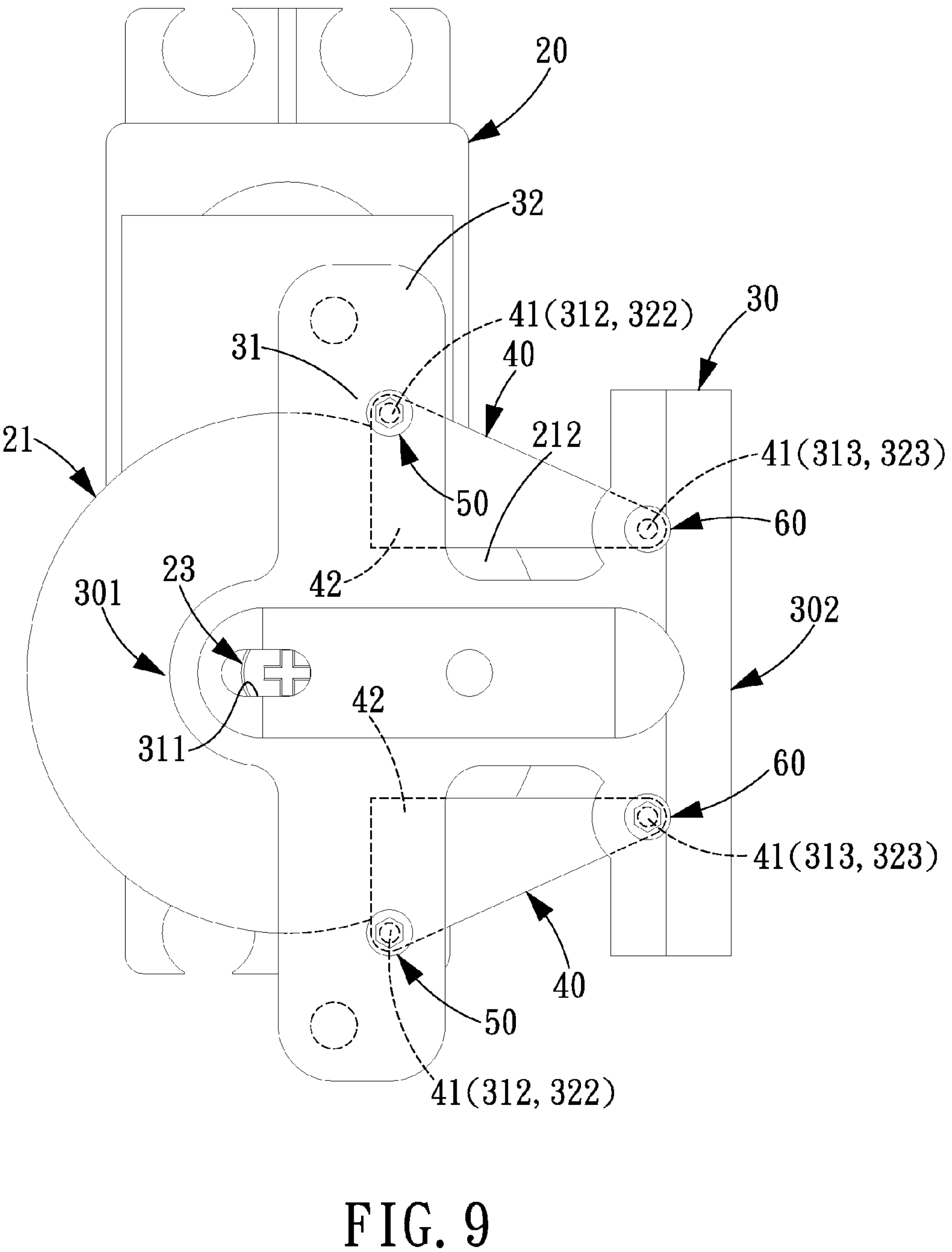
FIG. 9 is a top view showing that the lifting member in accordance with the present invention is equipped with gaskets to fill the gap of the open end when clamping force is carried out by two fastening members.
Figure 10:
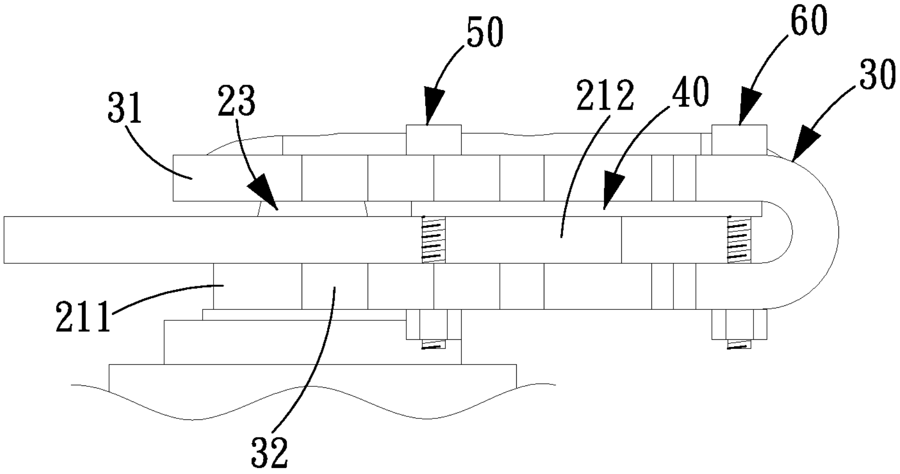
FIG. 10 is a cross sectional view showing that the gaskets are disposed between the active-lifting portion and passive-lifting portion of the lifting member.

Referring then to FIGS. 7 and 8, when a rotating force F is applied on the screwdriver A to loosen the screw 23, an upward force $\tau$ will be produced in the axial direction X to move the screw 23 upward in the axial direction X. At this moment, the active-lifting portion 31 of the lifting member 30 is lifted upward by the screw 23, and the upward push force is then transmitted to the passive-lifting portion 32 via the closed end 302. The passive-lifting portion 32 then lifts the assembling portion 212 of the servo horn 21 upward and disengages the inner spline 213 of the servo horn 21 from the outer spline shaft 22. When the lifting force $\tau$ is greater than the friction between the inner spline 213 and the outer spline shaft 22, the servo horn 21 of the servo 20 is lifted upward and separated from the outer spline shaft 22 to avoid the damage to the servo horn 21 and servo 20. Furthermore, with the lifting force $\tau$ produced by the rotating force F, the servo horn 21 can be easily separated from the outer spline shaft 22 in an efficient way simply by rotating the screw 23 counter clockwise. Besides, the assembling portion 212 of the servo horn 21 can be different shapes to meet with different applications. As shown in FIG. 2, for example, the servo horn 21 has the form of a rotating arm, and the assembling portion 212 has an elongated planar structure. Also as shown in FIGS. 9 and 10, the servo horn 21 has a disc shape and the assembling portion 212 is also disc-shaped.

It is important to emphasize when two fastening members 50 are tightened through the active-lifting portion 31 and the passive-lifting portion 32 of the lifting member 30 to clamp the servo horn 21, the lifting member 30 and the servo horn 21 are integrated as one piece. Therefore, when the screw 23 is rotated counter clockwise and hits against the lower edge of the elongated hole of the active-lifting portion 31, the lifting force is transmitted via the closed end 302 and is applied to the upper edge of the arc 321 of the lifting member 30 then lifts the integrated unit of the lifting member 30 and the servo horn 21 to separate the inner spline 213 of the servo horn 21 from the outer spline shaft 22. Gaskets 40 are necessary when there is a gap between the servo horn 21, the active-lifting portion 31 and the passive-lifting portion 32. Insertion of proper thickness of gaskets 40 must be done before tightening two fastening members 50 to clamp the servo horn 21 and the lifting member 30 together to avoid the distortion of the lifting member 30 at the opening end when the lifting force is greater than the rigidity of the lifting member 30. Gaskets 40 can be fixed by any holes provided by the lifting member 30 and fastening members 50. The rigidity is a must when the lifting force required is greater than the friction between the inner splines 213 of the servo horn 21 and outer splines of the servo outer spline shaft 22.

The body portions 42 of the respective gaskets 40 are disposed between the active-lifting portion 31 of the lifting member 30 and the assembling portion 212 of the servo horn 21 by through holes 41. The respective gaskets 40 are aligned with the positioning holes 312, 322 and the fixing holes 313, 323 of the lifting member 30, respectively. The fastening members 50 go through the positioning holes 312, 322 of the lifting member 30 and one of the through holes 42 of the respective gaskets 40 to fix the lifting member 30. Then two pivot members 60 are inserted through the positioning holes 312, 322 of the lifting member 30 and one of the through holes 42 of the respective gaskets 40. In this embodiment, the pivot member 60 comprises a bolt 61 and a nut 62.

For a better understanding of the function and operation of different versions of the present invention, reference should be made to FIGS. 11-14.

Figure 11:
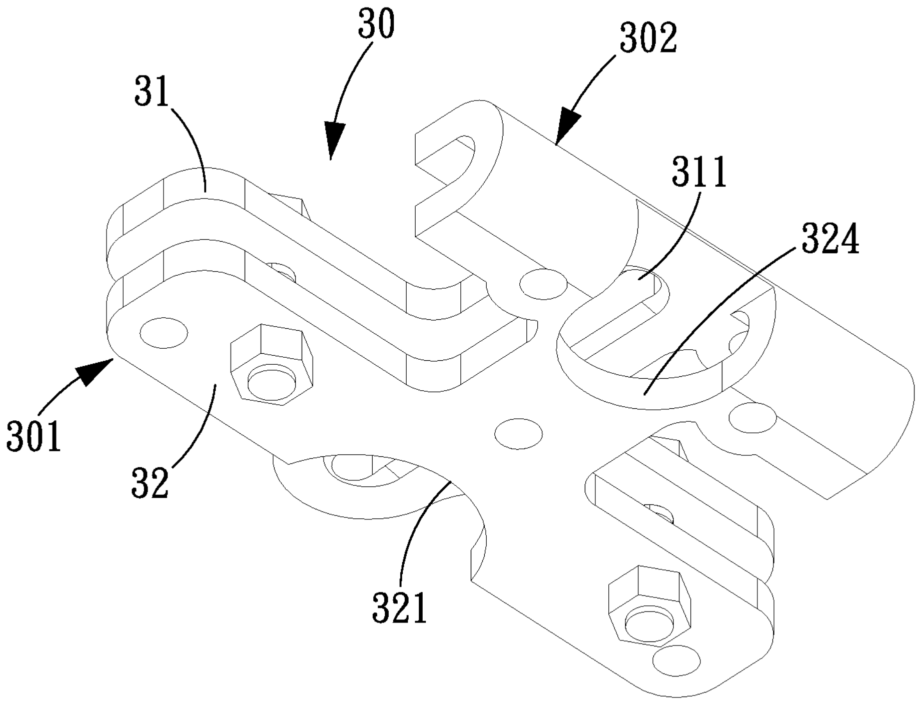
FIG. 11 is a perspective view in accordance with the present invention showing the lifting member with two arcs for two passive-lifting surfaces in passive-lifting portion.

Referring to FIG. 11, the closed end 302 is not only acting as the connecting bend for the active-lifting portion 31 and the passive-lifting portion 32 but also provides the solidly-formed clamping area when the servo horn 21 is seated on the upper edge of the arc 324. It eliminates the fasteners like the fastening members 50 when the servo horn 21 is clamped between the active-lifting portion 31 and the passive-lifting portion 32 with or without gasket 40. The elongated hole 311 of the active-lifting portion 31 is to receive the screw 23 when the lifting force is created during counter clockwise rotation of the screw 23.

Figure 12:
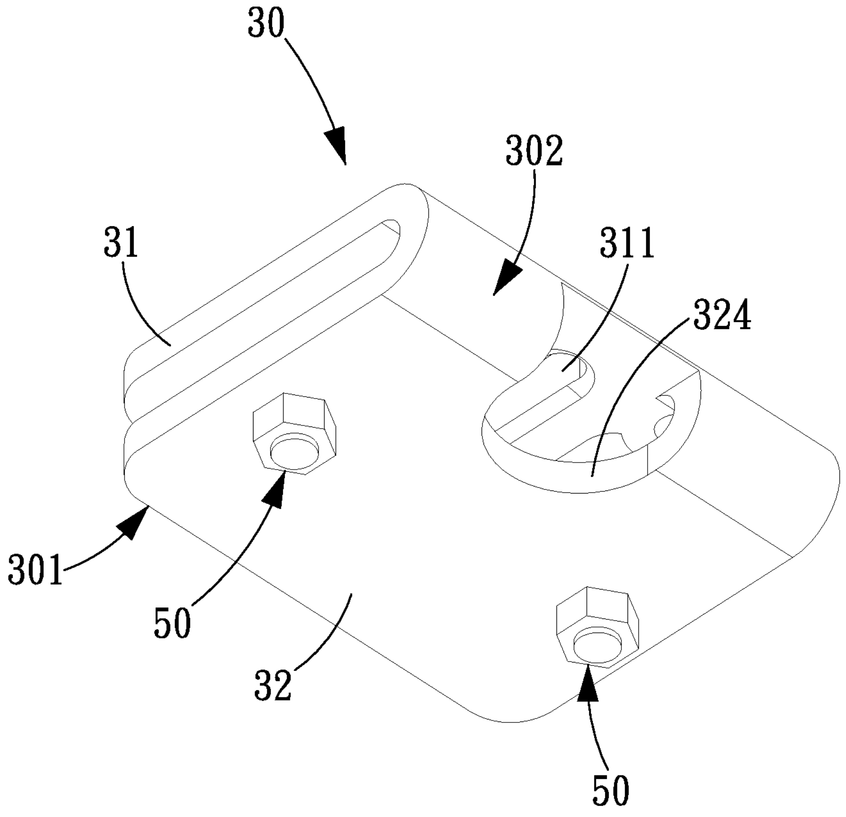
FIG. 12 is a perspective view in accordance with the present invention showing the passive-lifting portion with one arc.

FIG. 12 shows the simplified version of the lifting member 30.

Figure 13:
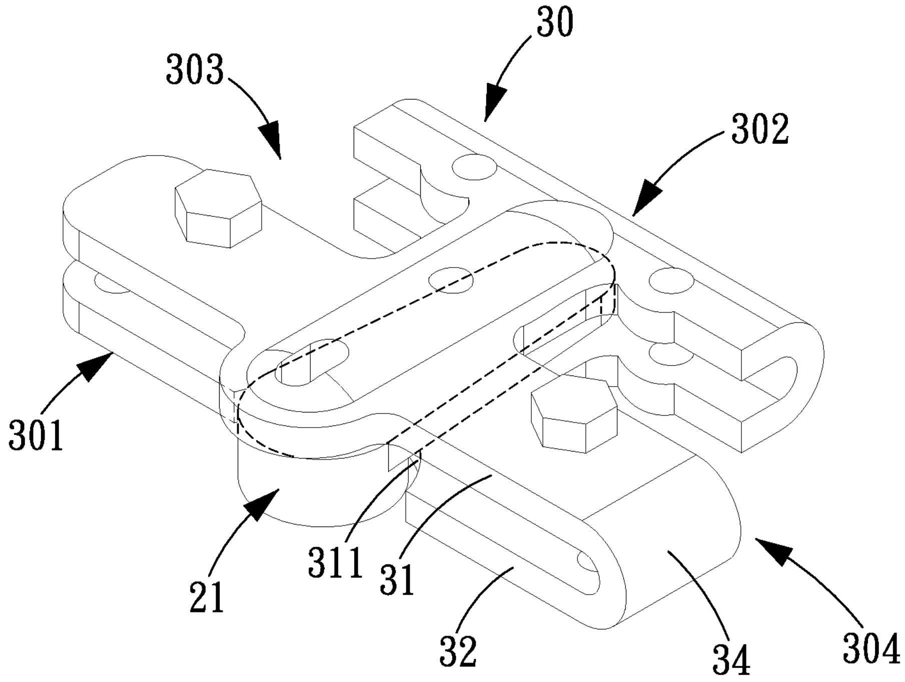
FIG. 13 is a perspective view in accordance with the present invention showing the lifting member with one additional closed ends.

Referring to FIG. 13, the lifting member 30 has an open end 303 in one side and the second closed end 304 in the opposite side. The function of the second closed end 304 is the same as closed end 302 so one fastening member 50 can be eliminated. One fastening member 50 in the opposite side of the second closed end 304 can provide clamping force with the rigidity of the second closed end 304 when the servo horn 21 is clamped.

Figure 14:
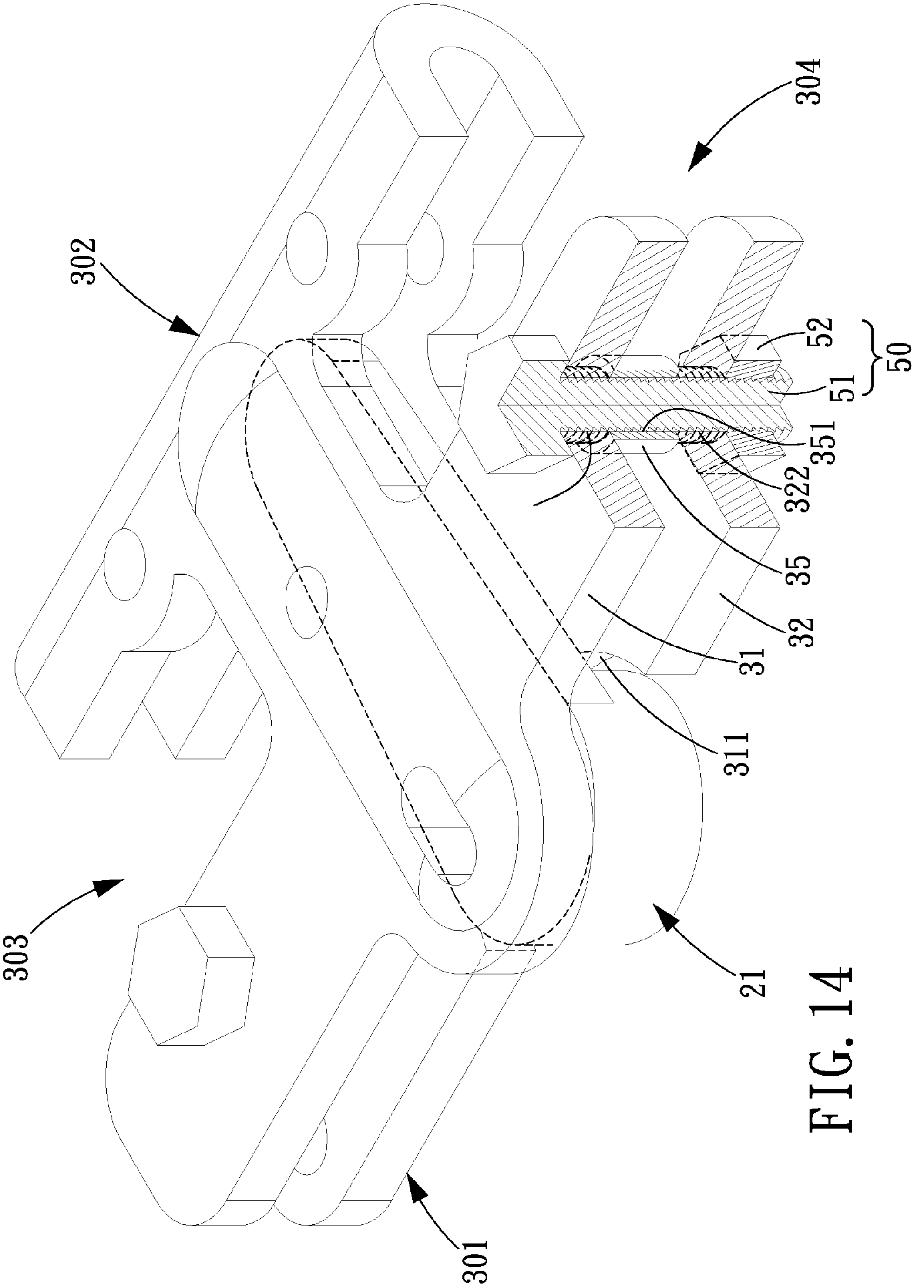
FIG. 14 is another perspective view in accordance with the present invention showing the lifting member with part of the opening end fixed by one fastening member to act like one additional closed end.

As shown in FIG. 14, the second closed end 304 of the lifting member 30 is formed by a sleeve 35 which is clamped between the active-lifting portion 31 and the passive-lifting portion 32 by a fastening member 50. The sleeve 35 has a central hole 351 aligned with the positioning holes 312, 322 of the lifting member 30 on the second closed end 304 then bolt 51 of the fastening member 50 can go through the sleeve 35 and tighten the active-lifting portion 31 and the passive-lifting portion 32 with the nut 52 to form a solid closed-end structure. The result is the same as FIG. 13.

What is claimed is:

1. A device for removing a metal servo horn from a servo comprising:

a lifting member consisting an open end with one upper plate and one lower plate connected by a closed end, the upper plate of the open end acting as an active-lifting portion with one elongated hole and being connected, via the closed end, to the lower plate which acts as a passive-lifting portion and is equipped with one arc to provide a lifting area for the servo horn to seat;

two fastening members clamping the active-lifting portion, the servo horn and the passive-lifting portion and combining the active-lifting portion, the servo horn and the passive-lifting portion into one integrated unit.

2. The device as claimed in claim 1, wherein the servo comprises an output shaft with outer splines and adapts to different servo horns with inner splines, the servo horn is formed with a connecting boss and an extension arm in a radial direction, the connecting boss has inner splines to match the outer splines of the output shaft of the servo, a threaded hole is formed inside of the servo output shaft to provide a secured engagement of the servo horn to the servo output shaft by tightening a screw.

3. The device as claimed in claim 1, when there is a gap between the two lifting portions and the servo horn, gaskets are disposed between the two lifting portions and the servo horn to fill the gap.

4. The device as claimed in claim 1, wherein each of the fastening members includes a bolt and a nut.

5. The device as claimed in claim 1, wherein a sleeve is clamped between the active-lifting portion and the passive-lifting portion.

* * * * *